Figure 1:
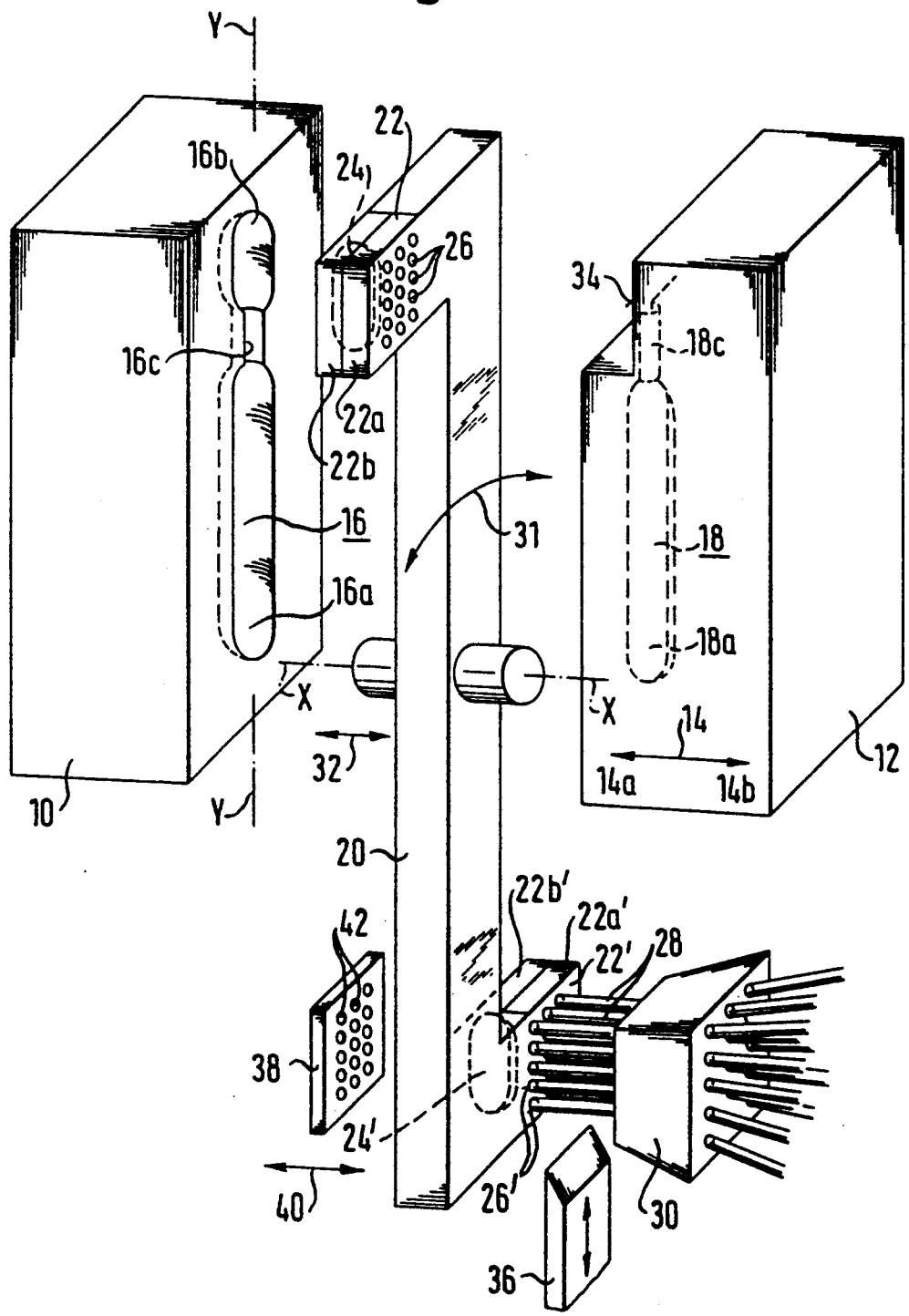

United States Patent [19]

Boucherie

[11] Patent Number: 5,143,424
[45] Date of Patent: Sep. 1, 1992

[54] BRUSH MAKING MACHINE
[75] Inventor: Bart G. Boucherie, Izegem, Belgium
[73] Assignee: G. B. Boucherie N.V., Izegem, Belgium
[21] Appl. No.: 708,369
[22] Filed: May 31, 1991
[30] Foreign Application Priority Data Jun. 28, 1990 [EP] European Pat. Off. ........ 90112340.6

[51] Int. Cl.⁵ .............................................. A46D 3/08
[52] U.S. Cl. ........................................ 300/2; 264/243
[58] Field of Search ...................... 300/2, 21; 264/243
[56] References Cited

U.S. PATENT DOCUMENTS

| | | | |
|---|---|---|---|
| 2,317,110 | 4/1943 | Person | 264/243 |
| 2,655,409 | 10/1953 | Baldanza | 300/2 X |
| 4,892,698 | 1/1990 | Weihrauch | 264/243 |

FOREIGN PATENT DOCUMENTS 0195134 9/1986 European Pat. Off. ................ 300/2

Primary Examiner—Douglas D. Watts
Attorney, Agent, or Firm—Sixbey, Friedman, Leedom & Ferguson

[57] ABSTRACT

A machine for making brushes, in particular tooth brushes, comprising two mold members having complementary cavities to define a molding chamber for injection molding a brush body, is further provided with a carrier member mounting at least two plate members provided with tuft-receiving throughholes and a molding surface. The carrier displaces alternatively the plate members between a mold closing position and a tuft loading position in front of a tuft loader and a heating plate.

8 Claims, 2 Drawing Sheets

BRUSH MAKING MACHINE

The present invention relates to a brush making machine and more particularly to a machine for making tooth brushes, wherein the brush bodies are injection-molded.

A machine of this type is shown in EP-A- 142 885. During the injection molding of the brush bodies tufts of bristles are embedded in the molding material. A first mold member has a mold cavity corresponding to a first portion of the brush body to be molded. A second mold member has a mold cavity corresponding to a second portion of the brush body to be molded. A plate member is provided with a molding surface and with holes for receiving tufts of bristles such that the tufts protrude from the molding surface, the plate member being adapted to close a portion of the mold cavity of the first mold member. The mold members are movable with respect to each other between a mold closing position in which their cavities define together a molding chamber and a mold opening position, and the plate member is movable between a mold closing position and a tuft loading position spaced from said mold closing position.

This machine, however, is unable to achieve high production rates, notably since the first and the second mold members must remain in their mold opening position all the time necessary for loading the tufts of bristles into the holes of the plate member and heating the ends of the bristles to form enlarged head portions, the plate member being then at its tuft loading position distant from its mold closing position.

The present invention provides a brush making machine for injection molding brush bodies which is capable of high production rates. This is achieved by providing a brush making machine of the type mentioned above with the following additional features:

a) The molding surface of said plate member delimits a mold cavity corresponding to a first head portion of the brush body to be molded, the remaining head portion of the brush body being defined by a portion of the mold cavity of said first mold member;

b) The plate member has an outer shape which is complementary to a recess formed in said second mold member, the mold cavities of said plate member and of said second mold member communicating with each other substantially at a neck portion of the brush body when said plate member and said second mold member are in their mold closing positions so as to form a common continuous mold cavity; and c) The plate member is mounted on a carrier, the latter mounting at least one further similar plate member, said carrier being movable to move one of said plate members to its mold closing position and simultaneously the other plate member to its tuft loading position, and vice-versa.

Accordingly, since there are at least two plate members, a first one of them being in the mold closing position and the other being in the tuft loading position, the loading of tufts in this other plate member is effected while a brush body is being injected in the molding chamber defined by the first and the second mold members in their mold closing position and further closed by the first plate member. A high production rate can therefore be achieved with a very simple machine.

Further, when it is desired that the ends of the tufts protruding from the molding surface of the plate member be fused together to form anchoring heads, the machine can also comprise a heating plate located in facing relationship with the molding surface of the plate member when the latter is in its tuft loading position.

Here again, the fusing of the tufts into anchoring heads is effected simultaneously with the injection molding of a brush body, without loss of time.

The heating plate is stationary or need be moved only over a short distance, which is advantageous as regards both the structure of the heating plate and its connections to a power source.

Advantageously, the carrier member is movable both in rotation about an axis substantially perpendicular to the longitudinal axis of the brush body and in translation along said axis. The movements of the carrier member to displace the plate members from their mold closing position to their tuft loading position can therefore be achieved very simply, inasmuch as the carrier on the plate members can be of small size and low weight.

Figure 2:
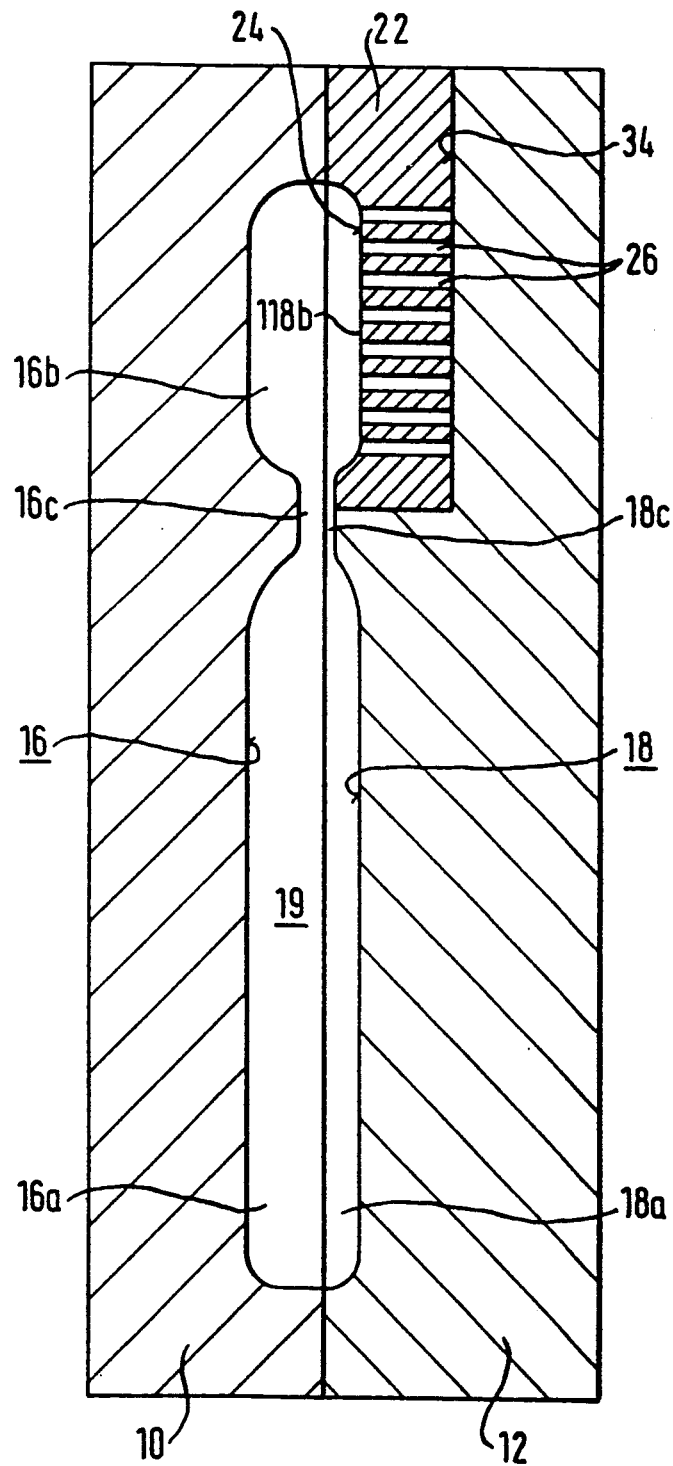

Other details and advantages of the invention will now be described with reference to the accompanying drawings, in which:

FIG. 1 is a schematic perspective view of a brush making machine according to the invention, and FIG. 2 is a cross section through the mold members of the machine, taken along the vertical center plane 2—2 in FIG. 1.

As shown in FIG. 1, the machine for making tooth brushes comprises a first mold member 10 preferably mounted stationary onto a machine frame not shown on the drawing, and a second mold member 12, movable towards and away from the first mold member 10 as illustrated by the double arrow 14.

The first mold member 10 is provided with a mold cavity 16 which corresponds to a first portion of the brush body to be molded; more specifically, the mold cavity 16 comprises three portions, a handle back portion 16a which corresponds to the back side of the handle of the brush body, a head back portion 16b which corresponds to the back side of the head of the brush body, i.e.: opposite to the tufts of bristles, and a neck back portion 16c, located intermediate to and narrower than the handle back portion and the head back portion, which corresponds to the back side of the neck of the brush body.

The second mold member 12 is provided with a mold cavity 18 which corresponds to a second portion of the brush body to be molded; more specifically, the mold cavity 18 comprises two portions: a handle front portion 18a which corresponds to the front side of the handle of the brush body and a neck front portion 18c, also narrower than the handle from portion 18a, which corresponds to the front side of the neck of the brush body.

When the second mold member 12 is moved in the direction 14a of the double arrow 14 until it comes into abutment with the first mold member 10, the two mold members reach a mold closing position in which their cavities 16, 18 define together a molding chamber 19 for the brush body, as best seen in FIG. 2.

Conversely, when the second mold member 12 is moved away from the first mold member 10 in the direction 14b, the two mold members reach a mold opening position, as illustrated in FIG. 1.

The machine further comprises a carrier member 20 which mounts two plate members 22, 22' similar to each other. Each plate member has a molding surface 24, 24' and is provided with throughholes 26, 26' for receiving tufts 28 of bristles which are dispensed by a tuft loader 30 located at a position spaced from the first and the second mold members 10, 12.

The molding surface 24 (24') of plate member 22 (22') delimits a mold cavity 118b (118b') which corresponds to the front side of the head of the brush body and the tufts 28 of bristles are loaded by the tuft loader 30 in such a manner that the tufts protrude from the molding surface 24 (24') to ensure the fastening of the tufts in the material of the body as it will be later explained.

The carrier 20 is movable both in rotation about a center axis XX perpendicular to and offset from the longitudinal axis YY of the brush body as indicated by the double arrow 31, and in translation along this axis XX as indicated by the double arrow 32, such that the carrier can move the two plate members 22, 22' in order to bring plate member 22 to its mold closing position, in which its molding surface 24 closes the head back portion 16b of the mold cavity 16 of the first mold member 10, as illustrated in FIG. 2, and to bring simultaneously the other plate member 22' in its tuft loading position in front of the tuft loader 30.

The second mold member 12 is provided with a recess 34 which is complementary to the outer shape of the plate member 22 (22') such that when the second mold member 12 is located against the first mold member 10 in their mold closing position, as better seen in FIG. 2, the plate member 22 (22') is accommodated in this recess 34 and the mold cavity 118b of plate member 22 and the mold cavity 18 of the second mold member communicate with each other substantially at the neck portion of the brush body and form a common continuous mold cavity.

By reverse displacement of the carrier member 20, the positions of the two plate members 22, 22' are inverted, plate member 22 coming to its tuft loading position in front of the tuft loader 30 and plate member 22' coming to its mold closing position between the two mold members 10 and 12.

Accordingly, it will be noted that when one of the plate members, for example plate member 22, is in its mold closing position and the second mold member 12 is brought into engagement with the first mold member 10, such that plate member 22 is accommodated in the complementary recess 34 of the second mold member 12, a brush body can be injection-molded in the molding chamber 19, via injection passages not shown in the drawings, as it will be readily apparent to a man skilled in the art. The ends of the tufts which protrude from the molding surface 24 of plate member 22 are embedded in the injected molding material, and are thereby securely held in place. As also well-known in the art, both mold members are provided with cooling ducts, not shown in the drawings, through which a coolant fluid is fed in order to cool the mold members 10, 12 and the molding material injected therein until the latter reaches a hardened state, whereupon the two mold members 10, 12 can be separated and the molded brush body can be ejected.

During the same time, the other plate member 22' is loaded with tufts of bristles by means of the tuft loader 30. More precisely, the tuft loader is brought into engagement with this plate member 22' such that the tuft dispensing orifices of the tuft loader register with the throughholes 26' of the plate member, the tuft loader is then actuated to dispense tufts 28 of a predetermined length into the throughholes such that the tufts protrude from the oppositely located molding surface 24' of the plate member 22'. The tuft loader 30 is then displaced away from the plate member 22' and the tufts 28 are cut by a cutter 36 slidably mounted between the plate member and the tuft loader.

Preferably, the ends of the tufts 28 protruding from the molding surface 24' of the plate member 22' are fused together into an anchoring head for better securing of the tufts into the injected body material. This is achieved by means of a heating plate 38 disposed in facing relationship with the plate member 22' at its loading position.

As shown by the double arrow 40, the heating plate 38 is movable over a short distance towards the plate member 22' in order to come into engagement with the tuft ends and cause them to fuse, and away from the plate member 22' once the tuft ends have been fused.

Preferably, the heating plate 38 is provided at its surface with a plurality of small molding depressions 42 in front of the tuft ends in order to form rounded heads onto the tufts 28, whereby the heating plate 38 can also be regarded as a shaping tool.

Advantageously, the heating plate 38 is generally flat and the plate member 22 (22') is comprised of two portions 22a, 22b (22a', 22b') arranged in parallel relationship to each other. A first portion 22b (22b') is solid with the carrier plate 20 and is provided with the tuft receiving throughholes 26 (26'), and a second portion 22a (22a') is movable in relation to the first portion 22b (22b').

Therefore, when the plate member 22' is in its tuft loading position, its second portion 22'a can be moved in relation to its first portion 22b' by displacement means not shown on the drawings. This displacement of the portions 22a' and 22b' relative to one another, provides in a clamping force against the sides of the bristle tufts in order to hold these bristles firmly in place in the tuft receiving throughholes 26 (26'), specially during displacement of the carrier member 20, as well as inorder to prevent leakage of molding material through the gaps left inbetweeen the otherwise loose fibres which are filling the throughholes 26.

As a variant, the heating plate 38 can be provided with a raised boss for penetrating the molding cavity 118b (118b') of the plate member in order to come into engagement with the tuft ends. This variant will be readily apparent to those with ordinary skill in the art and has therefore not been illustrated.

It will be noted that while a brush body is being injection-molded by means of one of the plate members 22, the other plate member 22' is being loaded with a set of tufts 28, the tufts are being cut and their ends are being fused during the same time. Therefore, when the mold members 10, 12 are separated and the molded brush body is ejected from the molding chamber at the end of the molding cycle, a new plate member 22' is ready for starting a new molding cycle without time loss. To this end, the carrier plate 20 is displaced to bring the other plate member 22' into its mold closing position, and the one plate member 22 to its tuft loading position, this being achieved extremely fastly and by very simple displacement means, which need not be detailed as being of common knowledge to man with ordinary skills.

It is also noted that the carrier plate 20 and the plate members 22, 22' have a reduced size and a low weight and their displacement entails relatively low inertia forces.

Another advantage of the invention resides in the fact that the mold members 10, 12, which are typically provided with cooling passages for a coolant fluid, move only over a limited distance. Their connections to a coolant fluid supply circuit, not shown, can be easily achieved by short flexible fittings. Although the first mold member 10 has been described as stationary, it will be understood that the invention also encompasses embodiments in which both the first and the second mold members 10, 12 are movable.

Further, since the plate members 22, 22' are of relatively small size and snugly accommodated in the complementary recess 34 of the second mold member 12, there is no need to provide coolant passages in the plate members 22, 22'. Their cooling is ensured by heat transfer contact with the second mold member 12 and subsidiarily with the first mold member 10.

The connections of the heating plate 38 to a power supply source are also simplified since its displacements are of limited amplitude.

According to a further variant not illustrated, the carrier plate 20 can be so mounted as to be slidably movable instead of being rotatable. The displacement of the carrier will then be effected in transverse direction with respect to the displacement direction XX of the first and the second mold members 10, 12, instead of being rotatable as hereinbefore described.

Still to another variant, the mold members 10, 12 can be provided with more than one cavity (16, 18) (multi-cavity mold) instead of just one as shown in FIG. 1.

The carrier plate 20 will then carry a corresponding number of plate members 22 in order to match with each of the cavities (16, 18).

Accordingly, a corresponding number of tuft loaders (30) is provided to dispense tufts of bristles to each of the plate members 22 or one tuft loader (30) serves the plate members 22 sequentially one after the other.

Finally, per cavity the number of plate members carried by the carrier member 20 can be higher than two as described heretofore.

What is claimed is:

1. A brush making machine comprising a mold for injection molding brush bodies having tufts of bristles embedded in the molding material, wherein
   a) said mold comprises:
      a first mold member having a mold cavity corresponding to a first portion of the brush body to be molded;
      a second mold member having a mold cavity corresponding to a second portion of the brush body to be molded; and
      a plate member provided with a molding surface and with holes for receiving tufts of bristles such that said tufts protrude from said molding surface, the plate member being adapted to close a portion of said mold cavity of said first mold member;
   b) said mold members are movable with respect to each other between a mold closing position in which their cavities define together a molding chamber and a mold opening position, and said plate member is movable between a mold closing position and a tuft loading position spaced from said mold closing position;
   c) said molding surface of said plate member delimits a mold cavity corresponding to a first head portion of the brush body to be molded, the remaining head portion of the brush body being defined by a portion of the mold cavity of said first mold member;
   d) said plate member has an outer shape which is complementary to a recess formed in said second mold member, the mold cavities of said plate member and of said second mold member communicating with each other substantially at a neck portion of the brush body when said plate member and said second mold member are in their mold closing positions so as to form a common continuous mold cavity; and
   e) said plate member is mounted on a carrier, said carrier mounting at least one further similar plate member and being movable to move one of said plate members to its mold closing position and simultaneously the other plate member to its tuft loading position, and vice-versa.

2. A brush making machine according to claim 1 further comprising a heating plate located in facing relationship with said molding surface of said plate member when the latter is in its tuft loading position.

3. A brush making machine according to claim 2 wherein said heating plate is a heated shaping plate provided with a plurality of molding depressions for forming rounded heads on the ends of the tufts protruding from said molding surface of said plate member.

4. A brush making machine according to claim 1 wherein said carrier is movable both in rotation about an axis (XX) substantially perpendicular to the longitudinal axis (YY) of the brush body and in translation along said axis (XX).

5. A brush making machine according to claim 1 wherein said carrier is movable in transverse direction with respect to the direction of displacement of said first and second mold members.

6. A brush making machine according to claim 1 wherein said plate member comprises two portions, a first portion solid with said carrier plate and a second portion mounted on said carrier, said molding surface of said plate member being defined on said second portion.

7. A brush making machine according to claim 6 wherein said second portion of the plate member is movably mounted on said carrier.

8. A brush making machine according to claim 1 wherein said first mold member is stationary.

* * * * *